United States Patent
Patel et al.

(10) Patent No.: US 7,747,834 B2
(45) Date of Patent: Jun. 29, 2010

(54) MEMORY MANAGER FOR AN EMBEDDED SYSTEM

(75) Inventors: Mehul Patel, Bangalore (IN); Sumita Rao, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 111 days.

(21) Appl. No.: 10/956,411

(22) Filed: Sep. 30, 2004

(65) Prior Publication Data

US 2006/0069898 A1    Mar. 30, 2006

(51) Int. Cl.
G06F 13/00 (2006.01)
G06F 13/28 (2006.01)
G06F 9/00 (2006.01)

(52) U.S. Cl. .......................................... 711/170; 713/1
(58) Field of Classification Search ................. 711/170; 713/1
See application file for complete search history.

(56) References Cited

U.S. PATENT DOCUMENTS

| | | | |
|---|---|---|---|
| 5,577,243 A * | 11/1996 | Sherwood et al. | 707/7 |
| 5,652,865 A * | 7/1997 | Rawlings, III | 711/171 |
| 6,131,150 A * | 10/2000 | DeTreville | 711/173 |
| 6,363,468 B1 * | 3/2002 | Allison | 711/173 |
| 6,594,749 B1 | 7/2003 | Czajkowski | |
| 2005/0114621 A1 * | 5/2005 | Lahiri et al. | 711/170 |
| 2009/0005039 A1 * | 1/2009 | Kuhn | 455/435.1 |

FOREIGN PATENT DOCUMENTS

| EP | 1 130 520 A | 9/2001 |
|---|---|---|
| WO | WO 97/08622 A | 3/1997 |

OTHER PUBLICATIONS

Gorman, Mel, "Understanding The Linux Virtual Memory Manger", Thesis, pp. 1-140, Jan. 22, 2003.

* cited by examiner

Primary Examiner—Matt Kim
Assistant Examiner—Edward J Dudek (57) ABSTRACT

A memory manager acts on a memory that has been arranged with a predetermined number of fixed memory blocks, with each memory block set to a predefined size. These fixed blocks have been initialized to accelerate the allocation process. When a memory manger receives an allocation request, the size of the request is compared to the predefined size. If the memory manager determines that the fixed memory block handles the memory request, then the memory manager allocates one of the fixed blocks to the pending memory request. If no fixed block is available to handle the request, then the memory manager may allocate the memory from a free memory pool. The memory manager may search the available free memory blocks to identify and allocate the optimum free block that satisfies the pending allocation request.

26 Claims, 5 Drawing Sheets

MEMORY MANAGER FOR AN EMBEDDED SYSTEM

BACKGROUND

The field of the present invention is the management of memory resources for an electronic device. More particularly, the present invention relates to managing memory for a device having an embedded processor and memory system.

Many electronic devices use embedded processors. For example mobile electronic devices often include embedded processors, microprocessors, or other controllers for controlling the device and providing an interface to a user. More specifically, devices such as mobile wireless phones, personal data assistants, MP3 players, and cameras generally included embedded processors for monitoring, operating, and using these devices. Also, many consumer devices such as DVD players, CD players, stereo equipment, appliances, and motor vehicles include embedded operational controllers. These devices often have limited memory, such as RAM memory, to keep costs down. Also, these device's embedded controllers typically have limited processing capability, with the processor and memory carefully selected to avoid excess processing power. Such excess processing power unnecessarily raises the cost of the device. Also, if the device is portable or operates on battery power, then such excess processing power may drain scarce battery power and exacerbate heat issues. In this way, the embedded processor's limited memory, limited processor power, and simple structure cooperate to make cost sensitive and reliable devices.

A mobile wireless handset is one example of a portable device having an embedded processor and a limited memory system. The embedded processor in the mobile phone operates applications for call processing, diagnostics, and support applications. New mobile handsets are becoming more complex, offering the capability to send and receive high speed data, as well as receive and process GPS signals for location and position information. Further, consumers are demanding more interesting and more useful interaction with their mobile handsets. For example, modern mobile handsets often operate games, music players, contact managers, and digital cameras. All these new applications and requirements are placing increasing pressure on the embedded processor and memory systems.

Applications, such as a user application or an operating system application, need memory space to execute or to store data. Since memory space on the device is limited, memory is dynamically allocated to each application as that application requires additional memory space. Embedded processors, as well as other processors, generally use a memory manager to manage memory resources. When an application needs additional memory space, the application makes a memory allocation request to the memory manager. The memory manager locates a segment of free memory that is typically larger than the request, and allocates the requested memory to the application. When the application ends, or the application no longer needs the memory, the application informs the memory manager that the memory space may be de-allocated. The memory manger then places the memory back in the memory pool, where it becomes available for a future allocation.

The memory manager is typically allocating memory to many concurrent processes and applications, and continually returning blocks back into the available memory pool. Since the memory requests and allocations are of varying sizes, and may be quite random, over time the memory becomes fragmented and under utilized. For example, if the memory manager receives an allocation request for 850 bytes, it may find a free memory block of 1 k (1024) bytes in the memory pool. The memory manager will allocate 850 bytes to handle the memory request, leaving a small free block of only 174 bytes. Unless a very small allocation request is received, these 174 bytes will not be used. The memory manager must expend considerable processing resources in managing and reclaiming memory resources, and even with such effort, the memory system remains underutilized and fragmented.

SUMMARY

Briefly, the present invention provides a memory manger that acts on a memory that has been arranged with a predetermined number of fixed memory blocks, with each memory block set to a predefined size. These fixed blocks have been initialized to accelerate the allocation process. When a memory manger receives an allocation request, the size of the request is compared to the predefined size. If the memory manager determines that the fixed memory block handles the memory request, then the memory manager allocates one of the fixed blocks to the pending memory request. If no fixed block is available to handle the request, then the memory manager may allocate the memory from a free memory pool. The memory manager may search the available free memory blocks to identify and allocate the optimum free block that satisfies the pending allocation request.

In one example, the memory manager operates on an embedded processor for managing a limited memory system in a portable device. The memory system has a fixed memory portion and a free memory portion, which have been sized according to application and device requirements. The fixed memory portion has blocks of memory at predefined sizes according to the size and number of expected allocation requests. In this way, many of the received allocation requests can be efficiently satisfied by allocating one of the pre-initialized fixed blocks. Other requests may be satisfied from the free memory portion, in which case the memory manager searches a list of free memory blocks to find the smallest free block that handles the pending request. Efticiency is increased by pre-sorting the list according to size.

Advantageously, the new memory manager provides a faster, more efficient, and more effective allocation of memory. These advantages are particularly evident on devices operating with limited processing and memory assets, such as a portable battery powered wireless handset. By better utilizing processor and memory assets, devices may be made to operate more reliably and to support more sophisticated applications.

DETAILED DESCRIPTION

Figure 1:
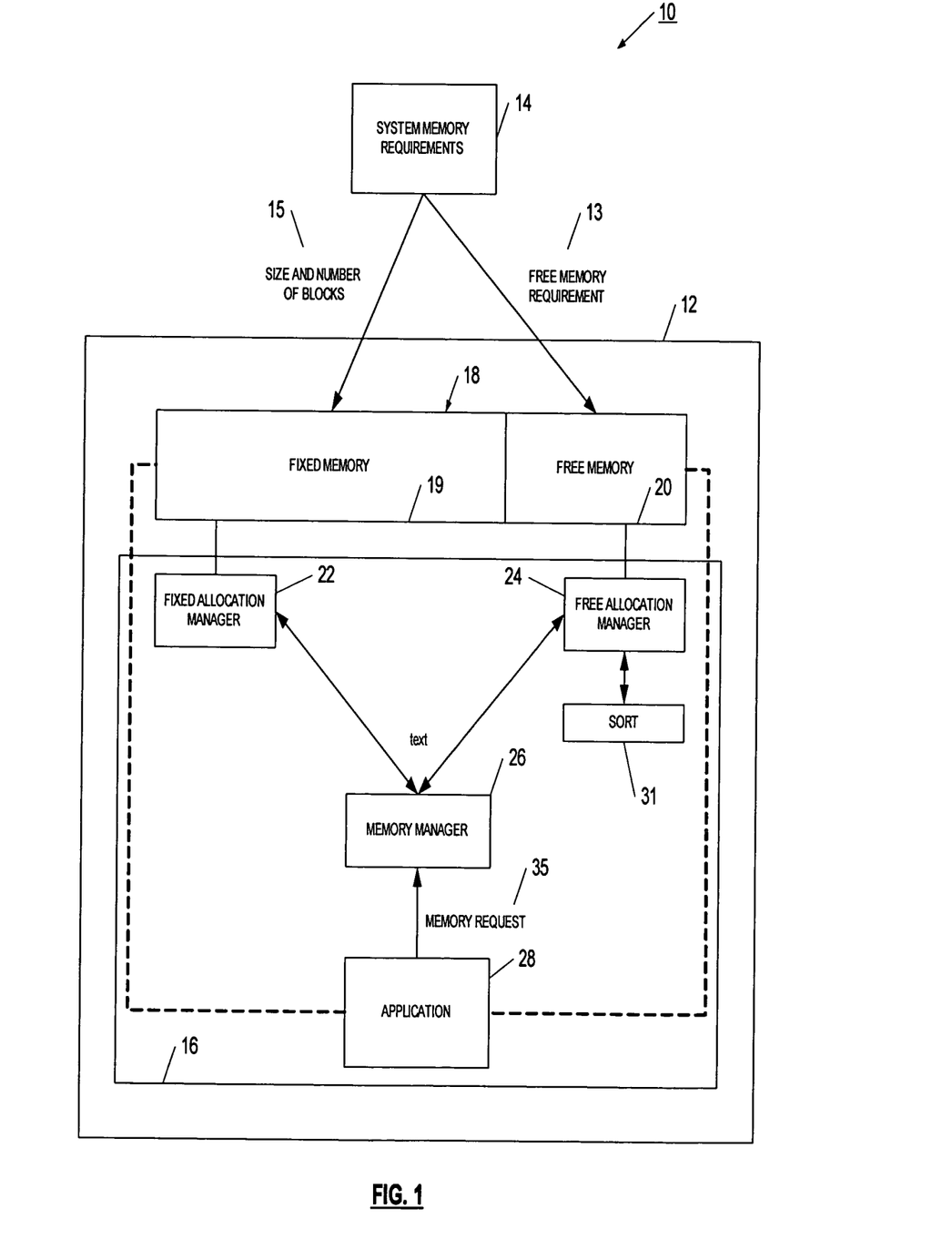
FIG. 1 is a block diagram of a memory management system in accordance with the present invention.

Referring now to FIG. 1 a memory manager system 10 is illustrated. The memory manager 10 operates on a portable electronic device 12, and enables the device to utilize efficiently its limited processing and memory assets. The electronic device 12 may be for example, a portable electronic device having an embedded processor 16 and a random access memory 18. Although the memory manager system 10 is described with reference to a portable electronic device, it will be understood that the memory manager may be used on other processor systems and computation devices. As with many electronic devices, it is important that the electronic device 12 efficiently use its processor and memory resources. To accomplish this, the device's memory requirements are predetermined and provided as a set of memory requirements 14. By establishing these memory requirements 14, the physical memory 18 may be particularly arranged according to the specific memory needs of the device. These memory requirements 14 may be set in advance by a designer, or may be dynamically adjusted by the device according to actual operational experience. However these requirements are established, the determined memory requirements 14 are applied and implemented in the electronic device 12.

The memory requirements 14 may be estimated using simulation processes, or may be determined through use of prototype or actual electronic devices. The memory requirements 14 are set according to the expected operational condition of the electronic device 12, including the applications the device is expected to operate. In this way, the evaluation process is useful to assess the specific memory requirements for the electronic device. For example, the memory requirements 14 may identify a specific size or sizes of memory blocks that are often allocated for execution of particular applications or processes. The memory requirements 14 may also estimate how many memory blocks at each specific size are likely to be active at one time. With this information, the memory requirements 14 indicates a desirable amount of memory to dedicate as fixed memory blocks. It is unlikely that all the memory requirements for the electronic device 12 can be satisfied with specific fixed memory blocks. Accordingly, the design consideration must also determine a free memory requirement 13.

Once the size and number of fixed blocks 15 and the free memory requirement 13 has been determined through the design process, those memory requirements can be applied to the electronic device 12. These memory requirements can be applied through firmware, software, or hardware architecture in the design of the electronic device. However implemented, the design considerations partition the random access memory 18 into a fixed memory portion 19 and a free memory portion 20. The fixed memory portion 19 has predefined fixed memory blocks which may be efficiently allocated to specific memory requests, whereas the free memory portion 20 provides a memory pool for other memory requests.

The electronic device 12 has a processor 16 for operating and controlling the electronic device 12. It will be understood that the processor 16 may be in the form of a microprocessor, a gate array, a PLD, or other logical device. It will also be appreciated that the processor 16 may be constructed as a multiple processor system or with discrete logic supporting the processors. Generally, the processor 16 interfaces with the memory 18 and allows an application 28 to be executed. The application may be an operating system function or process, an input or output function, or a user application. When operating, the application 28 may make a memory request 35 into a memory manager 26. If the memory request 35 is for a size equal to one of the fixed memory blocks, then the memory request 35 will be handled by the fixed allocation manager 22. In this way, the fixed allocation manager can immediately allocate one of the available fixed memory blocks to the memory request 35. Since the memory block has been pre-initialized, the allocation of the fixed memory block is highly efficient. If the memory request 35 is for a memory size not predefined as a fixed memory block, then the free allocation manager 24 handles the memory request. The free allocation manager 24 would also handle the memory request if the request is for a fixed memory size, but no fixed memory block is available for allocation. The free allocation manager 24 maintains a searchable list 31 of available memory blocks 31. The searchable list 31 arranges available memory blocks so that the free allocation manager can efficiently sort to find the smallest available free memory block that will satisfy the memory request. By using the smallest memory block, the free memory portion 20 is most efficiently used.

Advantageously, the electronic device has a memory 18 which may be allocated in a highly efficient manner. For example, the fixed memory portion 19 has pre-initialized memory blocks available for often used memory requests. Since these blocks are pre-initialized they may be allocated with minimal overhead and delay. For other memory requests, the sizes of available free memory blocks have been sorted and arranged so that a memory manager is able to identify an optimal block for each particular memory request. The combination of a fixed memory portion and a sorted free memory portion provides highly desirable operational characteristics for the electronic device 12.

To improve memory utilization, the memory requirements 14 are tuned to the specific applications and process the device 10 will operate. In this way, a device may have a different predefined memory arrangement depending on its intended use. For example, a wireless phone deployed in one carrier's network will be expected to run a set of applications and processes, and therefore is predefined to have a particular allocation between fixed and free memory, and the fixed memory is pre-initialized for a defined number and size of blocks. That same wireless phone, if configured for deployment on a different carrier's network, may be expected to run a different mix of applications and processes, and therefore may have a different predefined memory configuration, including fixed/free allocation and the defined number and size of fixed blocks. By tuning each device for its actual intended use, the memory manger is able to make the best use of available memory and processor resources.

Figure 2:
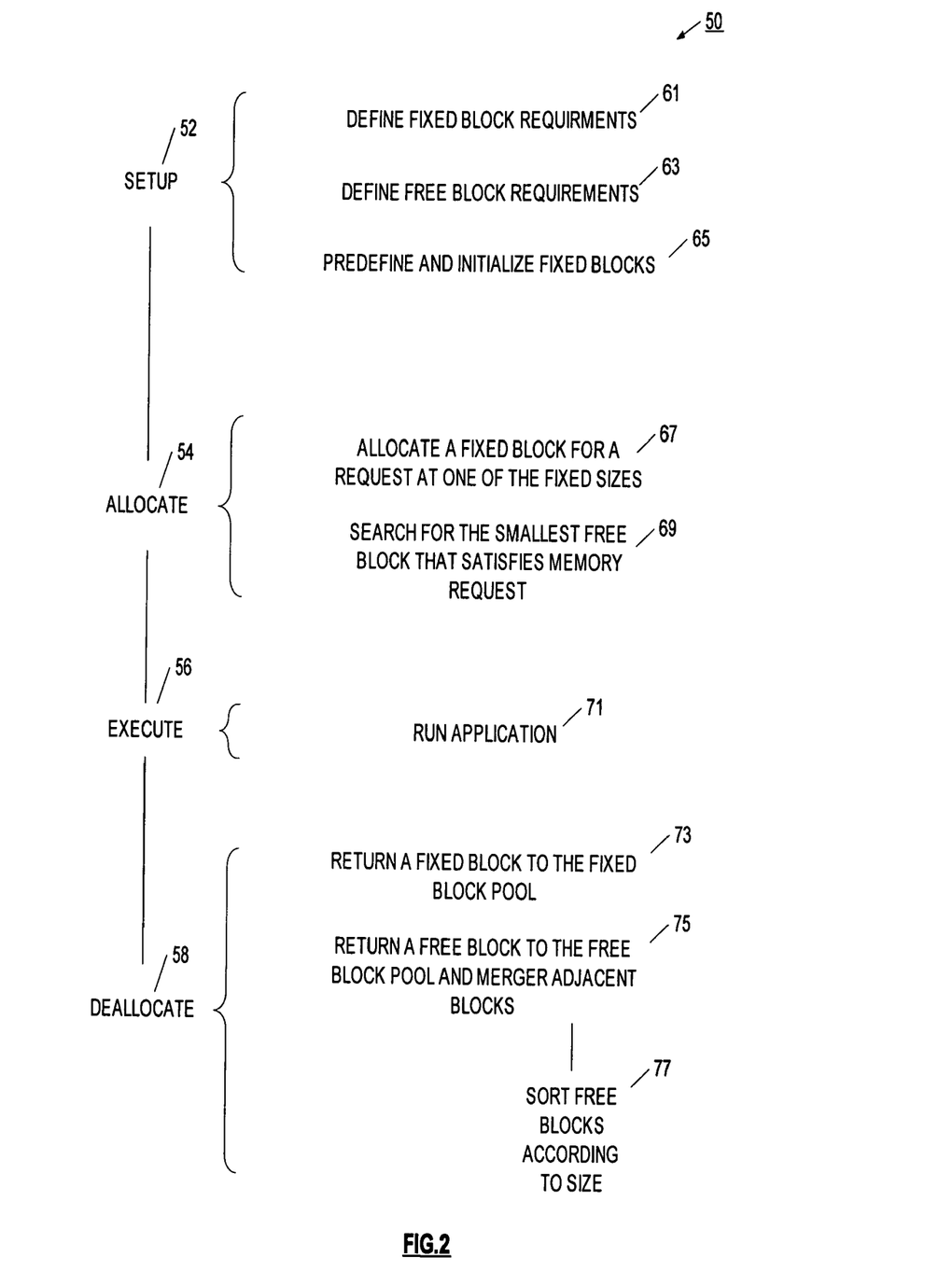
FIG. 2 is a flowchart of a memory management system in accordance with the present invention.

Referring now to FIG. 2, a flowchart for a memory manager 50 is illustrated. The memory manager system 50 generally has a setup stage 52, an allocate stage 54, an execute stage 56, and a de-allocate stage 58. The setup stage 52 includes a design function where a designer determines and sets software, firmware, and hardware architecture for an electronic device, while the allocate 54, execute 56, and de-allocate 58 functions all operate on the electronic device. However, it will be appreciated that certain of the setup functions may be adjusted dynamically according to operational conditions.

The setup function 52 first defines fixed block requirements 61. In many software applications, and especially in embedded applications, certain memory block sizes are requested repetitively. For example, at various times an application may operate to display many graphical elements on a display panel. Each time a new element is displayed, the application is likely to make a memory request. To simplify implementation, the application may have all or nearly all of its graphical elements set at the same size, for example, at 1 k bytes. Through simulation or other evaluation process, a designer may determine that it is likely that a particular number of graphical elements may be active at one time, for example, 25 elements. Accordingly, the designer may set and predefine 25 1 k blocks as fixed memory to be available for the allocation of graphical elements. It will be appreciated that depending upon specific hardware configurations, the designer may define more or fewer 1 k fixed blocks. For example, the designer may set only 20 1 k fixed blocks to obtain a higher utilization rate for the fixed memory, knowing that allocations exceeding 20 active elements will need to be handled by the less efficient free memory portion. In another example, the designer may set 30 1 k fixed blocks to decrease the likelihood that the system will need to use the free memory portion for any graphical element. The designer may also identify other functions in the electronic device which require a specific memory size. For example, an audio segment useful for tones and ringers may use a 512 byte memory block. Accordingly, the designer may set a number of 512 byte fixed blocks depending on how many of these blocks are likely to be active at one time. Further, there are likely to be certain system level operations that also require specific memory allocations. In one example, a wireless portable phone has call processing functions which use specific memory block sizes for receiving, manipulating, and transmitting voice and data information.

During the setup process, it is likely that the designer will identify specific block sizes used by the electronic device, but for overall efficiency purposes will choose not to define that block size as a fixed block size. For example, the power-on sequence for the electronic device may require the use of certain specific block sizes. However, since the power of sequence only occurs rarely, it may not be desirable to dedicate a fixed memory portion to the specific block sizes, and instead rely on memory allocations from a free memory portion to satisfy the power-on sequences. More generally stated, fixed memory is predefined to include the more often used block sizes, and the free memory is used for less frequently used block sizes. In this way, the memory is tuned so that the most frequent memory allocation requests are filled using fixed memory, which enable less fragmentation and more efficient use of memory. During the setup process 52, the designer must therefore make design choices between whether memory is more efficiently allocated from a fixed memory portion or from a free memory portion. Once the respective tradeoffs have been made, the designer is ready to define the fixed block requirements 61 and define the free block requirements 63.

The fixed block are then predefined and initialized for the electronic device as shown in block 65. It will be appreciated that the fixed block may be initialized through a hardware or firmware process, or may be predefined dynamically during an initialization sequence. It will also be understood that the relationship between the fixed portion and the free portion may be set differently for a device depending upon a specific device configuration. For example, a wireless mobile phone may have a phone function and a camera function, and may have a different memory configuration depending upon whether the device is initialized as a phone or as a camera. Further, a particular device may have different predefined memory requirements depending on the specific applications and processes the device is likely to use. Since the device is tuned for its intended applications, the device is enabled to more efficiently use its memory and processor resources.

Once the fixed and free memory portions have been defined, then the memory manger is used to allocate memory requests on the electronic device. When a memory request is made from an application, the memory manager determines if the memory request is for one of the fixed sizes as shown in block 67. The memory manger may be set to require an exact size match between the request and the fixed block size, or may be set to allow a fixed block to be used for requests for a slightly smaller size. For example, if a 1 k fixed block size is available, the memory manager may allow the allocation of a 1 k fixed block to satisfy a 995 byte request. Since the request is about equal to the fixed block size, overall efficiency may be gained by using a fixed memory block, even though some memory will be unused. It will be understood that the "looseness" of the match between the request and the block size can be set according to specific application needs.

If the memory request is for a size equal to a fixed block, but no fixed block at that size is available, then the request may be handled from the free memory. In a similar manner, if the memory request is for a size not present as a fixed memory block, then the memory request may also be handled by free memory. The memory manager 50 maintains a list of free memory block by size, as shown in block 77. When a memory request is to be handled from the free memory portion, the memory manager searches through the list to find the smallest available block that satisfies the memory request, as shown in block 69. By using the smallest free block, the memory is most efficiently used. It will be understood that other criteria may be used to find the optimum free block. Once the fixed memory block or free memory block has been allocated to the application, the application runs as shown in block 71.

At some time it is likely that the application will not need the memory block and will de-allocate the memory block back to the memory pool. If the memory was a fixed block, then the fixed block is returned to the fixed block pool as shown in block 73, whereas if the block came from the free portion, then the block is returned to the free block pool as shown in block 75. When the free block is returned, the memory manager merges adjacent unallocated blocks to generate the largest possible free memory blocks. Once the blocks have been returned and the merging process is complete, then the available free blocks are sorted according to size as shown in block 77.

Figure 3:
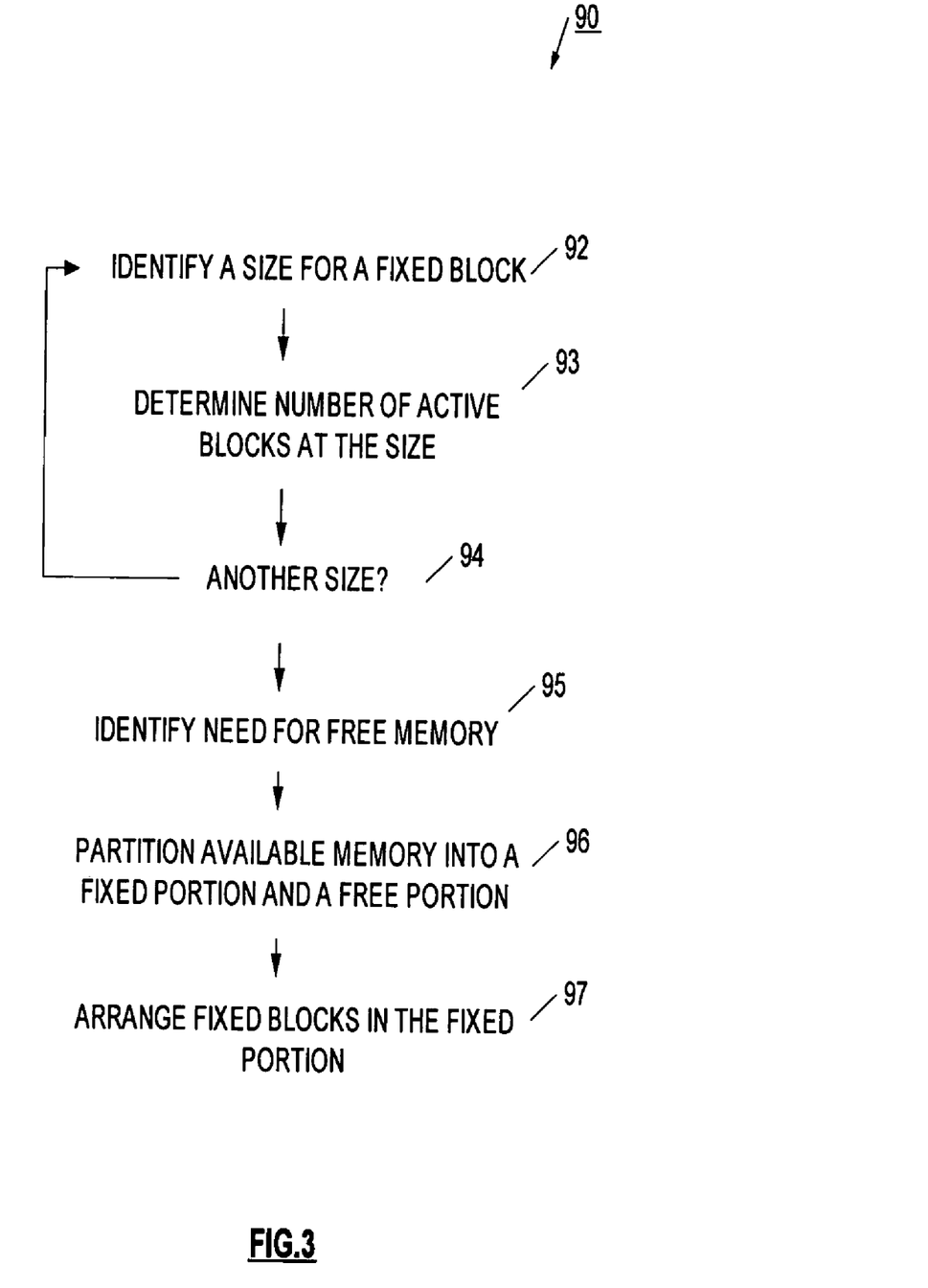
FIG. 3 is a flowchart of setting up a memory management system in accordance with the present invention.

Referring now to FIG. 3, a setup process 90 is illustrated for a memory management system. The setup process 90 is preferably performed for a particular device operating its actual applications and processes. In this way, the memory configuration that is predefined for each device is tuned according to expected operation, which should result in increase memory efficiency. This means, of course, that the same device may have different memory configurations based on even subtle changes to application mix. It also means that different devices operating the same processes are likely to have different memory configurations. The more care that is taken in tuning the memory to the actual use of the device, the more efficiently memory is likely to be used. The setup process 90 includes identifying a size for a fixed block as shown in block 92. For example, a fixed block size may be identified for a graphical element, an audio element, or a system element for a particular electronic device or application. The designer then determines the number of likely active blocks at that particular size as shown in block 93. It will be understood that the number of active blocks may be adjusted according to speed and utilization requirements. As shown in block 94, there may be multiple fixed block sizes available. For example, there may be a block size for a small graphical element, a medium graphical element, and a large graphical element.

Once the needs for the fixed blocks are defined, then the designer can define the need for free memory as shown in block 95. The physical memory is then partitioned between the fixed portion and the free portion as shown in block 96. This partitioning step may also include assigning a particular memory type to a fixed or free portion. For example, certain memory may be a cache or fast memory and other memory may be slower, for example, memory resident on a removable memory card. In this way, the designer not only may choose a relative size between the fixed and free portions, but may divide the memory according to speed requirements. If different speed memory is available, the designer may choose to put some of the fixed blocks in high speed memory, and provide additional fixed blocks in a slower memory. Once the system has been designed, then the fixed blocks can be initialized in the electronic device 97. It will be appreciated that the initialization process may be done through a hardware, firmware, or software process, and may be performed on the device during a power-up process. It will also be appreciated that the number and size of fixed blocks, as well as size of the free memory portion may be adjusted dynamically according to operational conditions.

Figure 4:
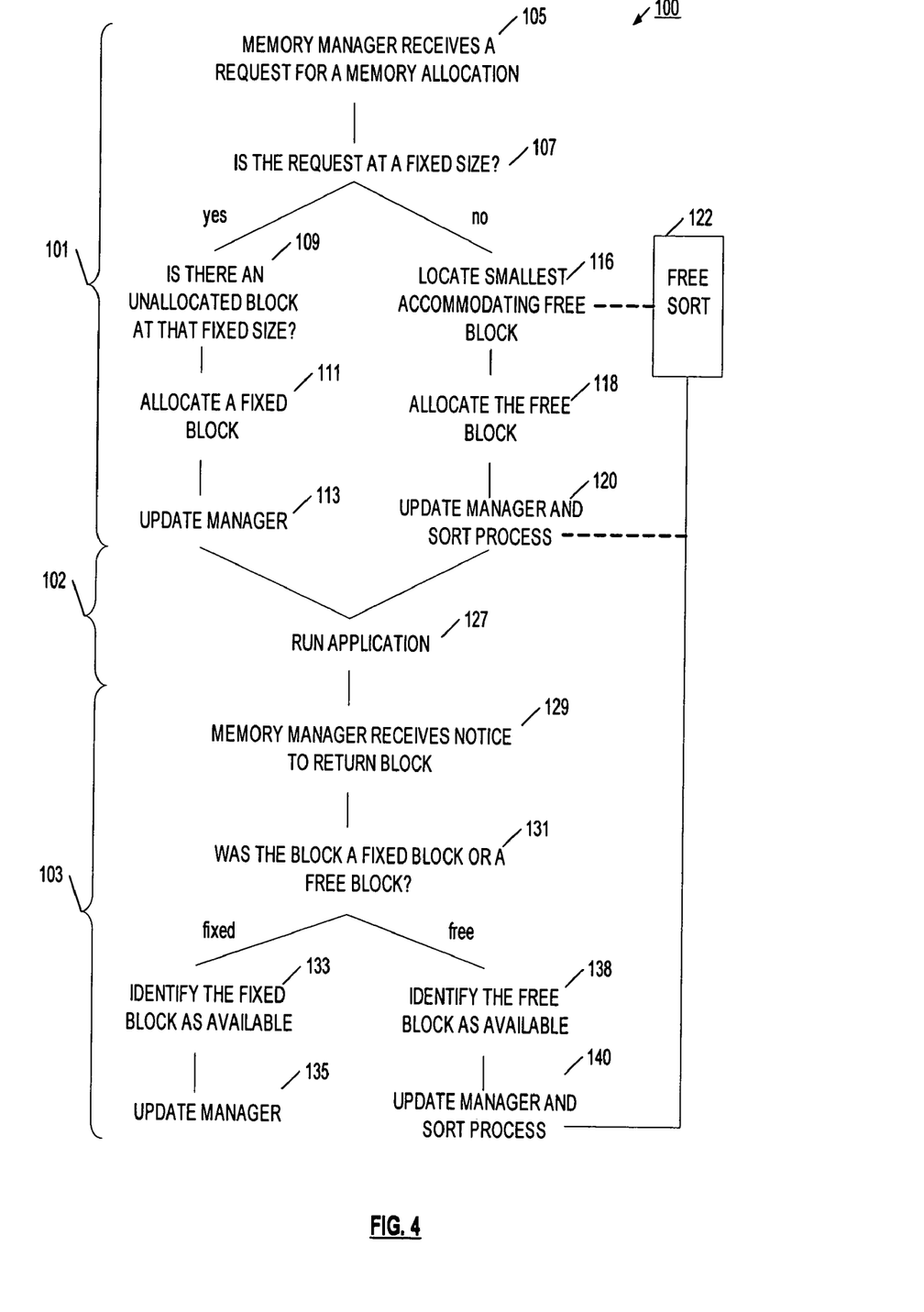
FIG. 4 is a flowchart of a memory management system in accordance with the present invention.

Referring now to FIG. 4, a memory manager 100 is illustrated. Memory manager 100 is for use on an electronic device, such as a portable electronic device having an embedded processor. As such, the device benefits from a highly efficient memory allocation process. Generally, the memory manager 100 has a setup stage for establishing a desirable set of fixed memory blocks, as well as sufficient free memory to support other memory requests. When the device is operational, an allocation stage 101 is used to select an appropriate memory block for each allocation request. The application executes 102, and when the memory is no longer needed, the memory is de-allocated 103.

An application operating on the device makes a request for a memory allocation as shown in block 105. The memory manager 100 determines if the request is for a size that has been predefined in a fixed memory portion of the device as shown in block 107. To allocate a fixed block, the memory manager may require that the request be exactly equal to the fixed memory block size, or may permit a smaller request that is about equal to the fixed size. If the memory manager determines that a fixed block size can be used, then the memory manager determines if there is an unallocated block at that fixed size as shown in block 109. If a fixed block at that size is available, then that block is immediately allocated to the memory request as shown in block 111, and the memory manager is updated 113 to indicate that the block is no longer available for allocation. If the memory request cannot be accommodated by an available fixed block, then the memory manager locates the smallest free memory block as shown in block 116. In this regard, the memory manager 100 maintains a sort list 122 which maintains a list of available free memory blocks arranged by size. In this way the memory manager can sort through the free sort list 122 to identify the smallest memory block that satisfies the memory request. By using the smallest possible memory block, free memory is more efficiently used. Once the smallest memory block has been identified, it is allocated as shown in block 118. The memory manager is updated to show that that free block is no longer available as shown in block 120. Further, the free sort list 122 is resorted and updated. Once the memory has been allocated, then the application runs as shown in block 127.

At some point, the application may de-allocate the memory block back into the memory pool, and therefore sends a message to the memory manager that the block will be returned as shown in block 129. The memory manager determines if the returned block was a fixed block or a free block as shown in block 131. If the block was a fixed block 133, then the fixed block is returned into the fixed block pool and the memory manger is updated 135 to show that the fixed block is now available for allocation to a different application. If the de-allocated was a free block as shown in block 138, then the free block is returned to the free memory pool. Preferably, the memory manager then merges the returned block with any unallocated adjacent blocks to generate larger available free blocks. The memory manager is updated to indicate the sizes and availability of free memory blocks, and the sort process is updated to indicate the new availability of memory block as shown in block 140.

Figure 5:
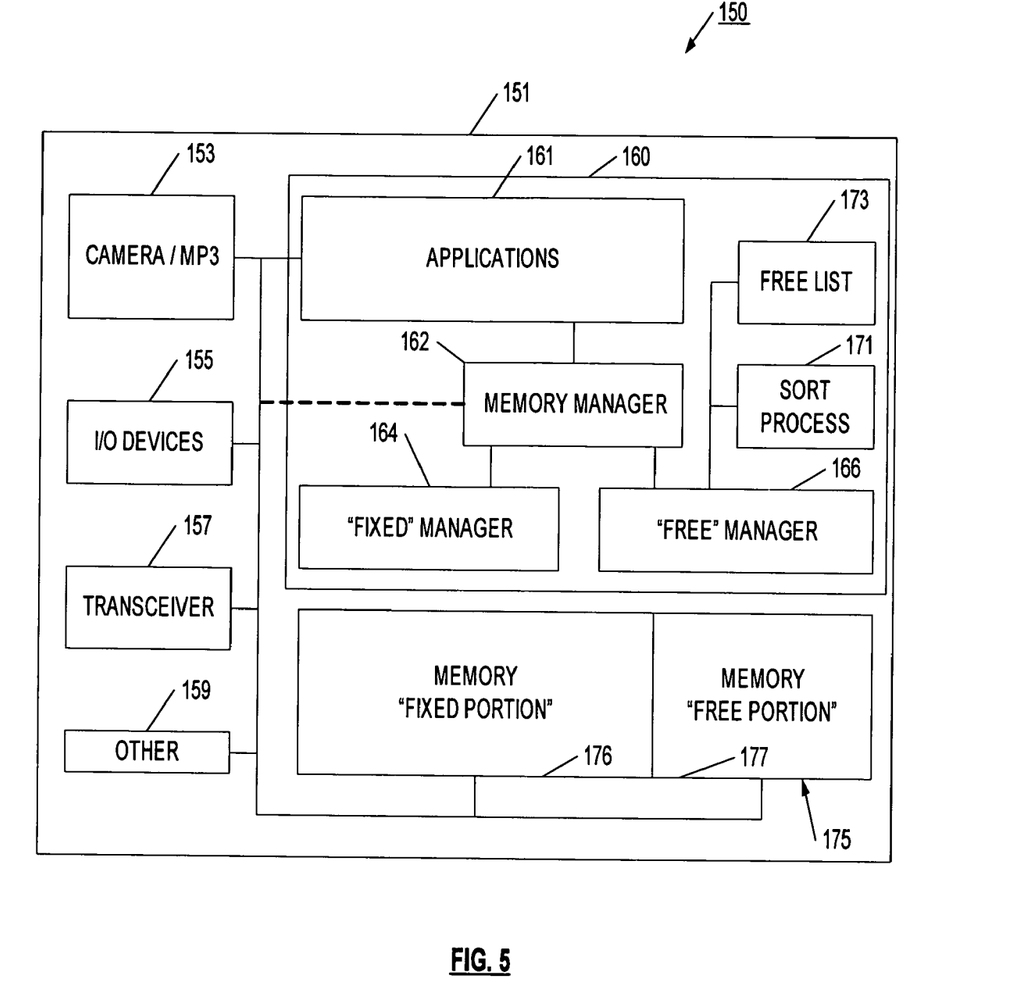
FIG. 5 block diagram of a mobile wireless handset having a memory management system in accordance with the present invention.

Referring now to FIG. 5 a wireless mobile handset 150 is shown in block diagram form. The wireless mobile handset 150 includes a housing 151 for holding the various components of the handset. The handset includes a processor 160 which controls the functions within the handset. The processor 160 may be for example, a baseband processor, a microprocessor, a PLD, a gate array, or other logical device. It will also be appreciated that processor 160 may comprise two or more separate processing elements. The processor controls and connects to other devices in the handset 151. For example, the processor connects to and controls a camera or audio player, if present, as shown in block 153. The processor also controls I/O devices 155 such as graphical or textual displays, LED lights, audio speakers, and ringers. The processor also cooperates with a transceiver 157 to receive and send wireless communications, including voice and data transmissions. It will also be appreciated that other 159 devices are included in the handset 151. For example, the handset 151 is likely to have a battery and battery control circuitry for allowing the handset to be mobile and portable. The construction of a general mobile handset is well known and will be described in detail herein.

The processor 160 is useful for running various applications 161. These applications may be user applications such as maintaining an address list or a game, or may be operating level applications. For example, the applications may include selecting and presenting graphical icons on a display, operating the camera or MP3 player, or processing, receiving, or sending voice and data transmissions. The processor may also operate a memory manager 162. The memory manager receives memory allocation requests from the applications 161 and uses a fixed memory manager 164 or free memory manager 166 to handle the allocation request. Although the memory manager function is shown in three separate blocks 162, 164, and 166, it will be appreciated that the functions may consist in fewer functional units, or may be partitioned into more cooperating modules. It will also be appreciated that although memory manager is shown operating on the processor, the memory manager may be operated on a separate processor or different logical device. The free memory manager 166 also maintains a list 173 of available free memory blocks. A sort process 171 may be used by the free memory manager 166 to identify and locate a free memory block of a particular size. The processor also couples to a memory system 175. It will be appreciated that the memory system 175 may be a single random access memory system, or may comprise different types of memory. For example, the memory 175 may include a fast cash memory, dynamic memory, or memory on a removable memory card. In accordance with the methods previously discussed, the memory 175 may be predefined into a fixed memory portion 176 and a free memory portion 177. Preferably, the fixed memory blocks in the fixed memory portion 176 are pre-initialized to make allocation of the fixed blocks more efficient.

In operation, an application 161 makes a memory request into memory manager 162. If the memory request is at a fixed block size, the fixed manager 164 allocates one of the pre-initialized memory blocks from the fixed memory portion. If the allocation request cannot be handled using a fixed memory block, then the free memory manager 166 sorts the free list 173 to locate the smallest available free memory block that will satisfy the allocation request, and the free manager allocates memory space from the free memory portion 177. The application then runs using the allocated memory, and when the memory is no longer needed, the memory manager returns the block into the memory pool. More specifically, if the memory block was allocated from the fixed memory portion 176, the memory is returned to that fixed portion 176, and if the memory block was from the free memory portion 177, then the memory is returned to the free memory portion 177. If the memory is returned to the free memory portion, then the free memory manager 166 merges the returned block with any available adjacent blocks, and updates the free list 173 according to the then available free memory blocks.

While particular preferred and alternative embodiments of the present intention have been disclosed, it will be appreciated that many various modifications and extensions of the above described technology may be implemented using the teaching of this invention. All such modifications and extensions are intended to be included within the true spirit and scope of the appended claims.

What is claimed is:

1. A method for managing a memory on a wireless communication device, comprising:
    determining a memory usage model for a first carrier based on a set of applications and processes expected to be run on a wireless communication device operating in a first network operated by said first carrier;
    determining a plurality of fixed memory block sizes based on said memory usage model for said first carrier;
    determining a number of fixed memory blocks at each of the plurality of fixed memory block sizes based on said memory usage model for said first carrier;
    determining a memory usage model for a second carrier based on a set of applications and processes expected to be run on a wireless communication device operating in a second network operated by said second carrier;
    determining a plurality of fixed memory block sizes based on said memory usage model for said second carrier;
    determining a number of fixed memory blocks at each of the plurality of fixed memory block sizes based on said memory usage model for said second carrier;
    selecting the first or second carrier network; and
    configuring the wireless communication device for operation on said selected carrier network by partitioning the memory into a fixed memory portion and a free memory portion, wherein the size of the fixed memory portion is based on the aggregate size of the blocks of memory at each of the plurality of fixed memory block sizes for said selected carrier network and establishing a plurality of blocks of memory in the fixed memory portion according to the predetermined number of fixed memory blocks at each of the plurality of fixed memory block sizes for said selected carrier network.

2. The method of claim 1, further comprising receiving an allocation request, comparing the size of the allocation request to the plurality of fixed memory block sizes and allocating one of the fixed memory blocks in response to the allocation request.

3. The method of claim 1, further comprising receiving an allocation request, comparing the size of the allocation request to the plurality of fixed memory block sizes and allocating a block of free memory in response to the allocation request.

4. The method of claim 3, wherein allocating further comprises identifying a plurality of free memory blocks in the free memory portion, sorting the plurality of free memory blocks according to size and allocating a free memory block having a size that optimally satisfies the allocation request.

5. The method of claim 3, wherein allocating further comprises identifying a plurality of free memory blocks in the free memory portion, sorting the plurality of free memory blocks according to size and allocating a free memory block having a size that minimally satisfies the allocation request.

6. The method of claim 1, further comprising receiving an allocation request, determining that no fixed memory blocks are available for allocation and allocating a block of free memory in response to the allocation request.

7. The method of claim 1, wherein one of the plurality of fixed memory block sizes corresponds to a size for a graphical element for display on a display of a wireless mobile handset.

8. The method of claim 1, wherein one of the plurality of fixed memory block sizes corresponds to a size for an audio element for play on a wireless mobile handset.

9. The method of claim 1, wherein one of the plurality of fixed memory block sizes corresponds to a size for a call processing element for use on a wireless mobile handset.

10. The method of claim 1, further comprising receiving a notification to de-allocate an allocated fixed memory block and identifying the fixed memory block as being available for future allocation.

11. The method of claim 1, further comprising receiving a notification to de-allocate an allocated free memory block and returning the free memory block to the free memory pool.

12. A computer readable medium having stored thereon one or more sequences of instructions for causing one or more microprocessors to perform the steps for managing a memory on a wireless communication device, the steps comprising:
    determining a memory usage model for a first carrier based on a set of applications and processes expected to be run on a wireless communication device operating in a first network operated by said first carrier;
    determining a plurality of fixed memory block sizes based on said memory usage model for said first carrier;
    determining a number of fixed memory blocks at each of the plurality of fixed memory block sizes based on said memory usage model for said first carrier;
    determining a memory usage model for a second carrier based on a set of applications and processes expected to be run on a wireless communication device operating in a second network operated by said second carrier;
    determining a plurality of fixed memory block sizes based on said memory usage model for said second carrier;
    determining a number of fixed memory blocks at each of the plurality of fixed memory block sizes based on said memory usage model for said second carrier;
    selecting the first or second carrier network; and
    configuring the wireless communication device for operation on said selected carrier network by partitioning the memory into a fixed memory portion and a free memory portion, wherein the size of the fixed memory portion is based on the aggregate size of the blocks of memory at each of the plurality of fixed memory block sizes for said selected carrier network and establishing a plurality of blocks of memory in the fixed memory portion according to the predetermined number of fixed memory blocks at each of the plurality of fixed memory block sizes for said selected carrier network.

13. The computer readable medium of claim 12, wherein the steps further comprise receiving an allocation request, comparing the size of the allocation request to the plurality of fixed memory block sizes and allocating one of the fixed memory blocks in response to the allocation request.

14. The computer readable medium of claim 12, further comprising receiving an allocation request, comparing the size of the allocation request to the plurality of fixed memory block sizes and allocating a block of free memory in response to the allocation request.

15. The computer readable medium of claim 14, wherein allocating further comprises identifying a plurality of free memory blocks in the free memory portion, sorting the plurality of free memory blocks according to size and allocating a free memory block having a size that optimally satisfies the allocation request.

16. The computer readable medium of claim 14, wherein allocating further comprises identifying a plurality of free memory blocks in the free memory portion, sorting the plurality of free memory blocks according to size and allocating a free memory block having a size that minimally satisfies the allocation request.

17. The computer readable medium of claim 12, further comprising receiving an allocation request, determining that no fixed memory blocks are available for allocation and allocating a block of free memory in response to the allocation request.

18. The computer readable medium of claim 12, wherein one of the plurality of fixed memory block sizes corresponds to a size for a graphical element for display on a display of a wireless mobile handset.

19. The computer readable medium of claim 12, wherein one of the plurality of fixed memory block sizes corresponds to a size for an audio element for play on a wireless mobile handset.

20. The computer readable medium of claim 12, wherein one of the plurality of fixed memory block sizes corresponds to a size for a call processing element for use on a wireless mobile handset.

21. The computer readable medium of claim 12, further comprising receiving a notification to de-allocate an allocated fixed memory block and identifying the fixed memory block as being available for future allocation.

22. The computer readable medium of claim 12, further comprising receiving a notification to de-allocate an allocated free memory block and returning the free memory block to the free memory pool.

23. A computer implemented method for managing a memory on a wireless communication device, where one or more processors of the wireless communication device are programmed to perform steps comprising:

identifying a set of applications and processes expected to be run on a wireless communication device operating in a first network operated by a first carrier;
determining a memory usage model for a said first carrier based on said identified set of applications and processes;
determining a plurality of fixed memory block sizes based on said memory usage model for said first carrier;
determining a number of fixed memory blocks at each of the plurality of fixed memory block sizes based on said memory usage model for said first carrier;
identifying a set of applications and processes expected to be run on a wireless communication device operating in a second network operated by a second carrier;
determining a memory usage model for said second carrier based on a said identified set of applications and processes;
determining a plurality of fixed memory block sizes based on said memory usage model for said second carrier;
determining a number of fixed memory blocks at each of the plurality of fixed memory block sizes based on said memory usage model for said second carrier;
selecting the first or second carrier network; and
configuring the wireless communication device for operation on said selected carrier network by partitioning the memory into a fixed memory portion and a free memory portion, wherein the size of the fixed memory portion is based on the aggregate size of the blocks of memory at each of the plurality of fixed memory block sizes for said selected carrier network and establishing a plurality of blocks of memory in the fixed memory portion according to the predetermined number of fixed memory blocks at each of the plurality of fixed memory block sizes for said selected carrier network.

24. The method of claim 23, further comprising creating a list of free memory blocks and sorting the list of free memory blocks according to size.

25. The method of claim 24, further comprising updating the list of free memory blocks in response to a free memory block allocation and resorting the updated list of free memory blocks according to size.

26. The method of claim 24, further comprising updating the list of free memory blocks in response to a free memory block deallocation and resorting the updated list of free memory blocks according to size.

* * * * *